United States Patent Office 2,983,574
Patented May 9, 1961

2,983,574

PREPARATION OF SODIUM BOROHYDRIDE

Joseph P. Nigon, Washington, D.C., assignor to Callery Chemical Company, Pittsburgh, Pa., a corporation of Pennsylvania No Drawing. Filed Sept. 23, 1955, Ser. No. 536,268

5 Claims. (Cl. 23—14)

This invention relates to the preparation of sodium borohydride and more particularly it relates to a direct method for preparing sodium borohydride by the reaction of sodium, diborane and hydrogen under pressure.

There are several known methods for preparing sodium borohydride among which are the following: (1) the reaction of sodium hydride and trimethyl borate at high temperatures (2) the reaction of a sodium alkoxide and diborane (3) the reaction of diborane and sodium trimethoxyborohydride (4) the reaction of sodium with hydrogen and trimethyl borate, a boron halide or a fluoborate (5) the reaction of sodium hydride with boric oxide. These methods while generally operative are not entirely satisfactory from the standpoint of yields obtained, conditions necessary to carry out the reactions or the difficulty in adapting such methods for large scale production. The prior art does not disclose a method for producing sodium borohydride by the direct process described in the invention hereinafter set forth.

It is an object of this invention to provide a new and improved method for preparing sodium borohydride.

Another object is to provide a direct method for preparing sodium borohydride by the reaction of sodium with hydrogen and diborane.

A still further object is to provide a new and useful method by which sodium borohydride can be prepared in a more simple and economical manner than that described in any of the prior art processes.

This invention is based upon the discovery that sodium borohydride can be prepared by the direct reaction of sodium with hydrogen and diborane under pressure at a temperature of about 50° C. in an inert solvent for sodium borohydride. This reaction takes place at temperatures less rigorous than that required for the formation of NaH, which begins at about 200° C., and thus it is possible to form NaBH$_4$ directly without first forming NaH as an intermediate. The reaction proceeds smoothly and the product is readily recovered.

In a typical experiment 5 g. (.20 mol) of sodium and 25 ml. of ethylene glycol dimethyl ether, $CH_3OC_2H_4OCH_3$, were placed in a 125 ml. pressure reactor and pressurized with 395 p.s.i.g. (0.12 mol) of diborane. The pressure was then increased to 800 p.s.i.g. with hydrogen (0.12 mol). The reactor was then rotated to stir the contents while heating at 50° C. for 106 hours. The crude product was separated from the unreacted sodium by extraction with isopropylamine. The solvent was removed under vacuum and a substantial amount of solid remained which was purified by crystallization from liquid ammonia. The solid was analyzed for sodium, boron and hydrogen and found to be NaBH$_4$. The compound was further subjected to chemical and X-ray analysis which confirmed the fact that it was sodium borohydride.

Other solvents for NaBH$_4$ may be used as reaction media for this process. Such solvents include polyethylene glycol dimethyl ethers, $CH_3(OC_2H_4)_nOCH_3$, and other known solvents for NaBH$_4$ which are not reactive with diborane. The process is operable over a range of temperatures from moderately above room temperature i.e., about 20° C., to the boiling point of the solvent used. The process is also operable at pressures as low as 350 p.s.i.g. There is no apparent upper limit of pressure.

Although only one embodiment of this invention has been described, it will be apparent to those skilled in the art that other variations are possible. Thus, it should be understood that within the scope of the appended claims this invention may be practiced otherwise than as specifically described.

What I desire to particularly point out and distinctly claim as my invention is:

1. A method of preparing sodium borohydride which comprises reacting sodium with hydrogen and diborane at a total pressure of at least about 350 p.s.i.g. and at a temperature between about 20° C. and about 200° C., in the presence of an ethylene glycol dimethyl ether solvent, and recovering the solid product thus formed.

2. A method according to claim 1 in which the solvent used is ethylene glycol dimethyl ether.

3. A method according to claim 1 in which the partial pressures of diborane and hydrogen are each in excess of about 350 p.s.i.g.

4. A method according to claim 1 in which the reaction is carried out at a temperature of about 50° C.

5. A method of preparing sodium borohydride which comprises reacting sodium with hydrogen and diborane in the presence of ethylene glycol dimethyl ether at a partial pressure of about 400 p.s.i.g. each of diborane and hydrogen at a temperature of 50° C. and recovering the sodium borohydride formed.

References Cited in the file of this patent

UNITED STATES PATENTS

| | | |
|---|---|---|
| 2,534,533 | Schlesinger et al. | Dec. 19, 1950 |
| 2,545,633 | Schlesinger et al. | Mar. 20, 1951 |
| 2,741,540 | Bragdon | Apr. 10, 1956 |

OTHER REFERENCES

Schlesinger et al.: "Journal of the American Chemical Society," vol. 73, page 187, January 5, 1953.

Schechter et al.: "Boron Hydrides and Related Compounds," prepared under Contract NO a(s) 10992 for Dept. of Navy, Bureau of Aeronautics; prepared by Callery Chemical Co.; printed March 1951; declassified December 1953; pages 50–52.

"Sodium Borohydrides," Bulletin 502A, published by Metal Hydrides, Inc.